US010402822B2

(12) United States Patent
Sahasranaman et al.

(10) Patent No.: US 10,402,822 B2
(45) Date of Patent: Sep. 3, 2019

(54) ENCRYPTION AND TOKENIZATION ARCHITECTURES

(71) Applicant: United Parcel Service of America, Inc., Atlanta, GA (US)

(72) Inventors: Mahesh Sahasranaman, Hamburg, NJ (US); Robert W Plumer, Glen Rock, NJ (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 14/657,065

(22) Filed: Mar. 13, 2015

(65) Prior Publication Data

US 2016/0012434 A1   Jan. 14, 2016

Related U.S. Application Data

(63) Continuation of application No. 13/969,059, filed on Aug. 16, 2013, now abandoned, which is a (Continued)

(51) Int. Cl.
G06Q 20/38 (2012.01)
H04L 29/08 (2006.01)
(Continued)

(52) U.S. Cl.
CPC ....... *G06Q 20/38215* (2013.01); *G06Q 20/12* (2013.01); *G06Q 20/24* (2013.01);
(Continued)

(58) Field of Classification Search
CPC .............................. G06Q 20/04; G06Q 20/341
(Continued)

(56) References Cited

U.S. PATENT DOCUMENTS 5,826,245 A   10/1998  Sandberg
5,883,810 A    3/1999  Franklin et al.
(Continued)

FOREIGN PATENT DOCUMENTS

EP      1 599 008 A1   11/2005

OTHER PUBLICATIONS

"Minimize the Burden of PCI Section 3: A New Approach to Credit Card Encryption," Paymentric, Inc., 2007.
(Continued)

*Primary Examiner* — Jessica Lemieux
(74) *Attorney, Agent, or Firm* — Shook, Hardy & Bacon L.L.P.

(57) ABSTRACT

Various embodiments of the present invention are directed to methods, systems and computer program products for conducting an online transaction on a website involving sensitive information. Such embodiments provide methods, systems and computer program products to: (a) register at least one entity with a gate keeper module, the registering comprising associating the entity with a subscription level; (b) associate a sub-string of a character string with a unique token so that a direct link does not exist between the unique token and the character string; and (c) during processing of the online transaction: (i) using the unique token for intermediate steps during the processing of the online transaction; and (ii) only accessing the character string in storage memory to complete the online transaction after receiving a request from at least one registered entity associated with a subscription level associated with a privilege to receive the requested sensitive information.

21 Claims, 5 Drawing Sheets

Related U.S. Application Data continuation of application No. 12/203,415, filed on Sep. 3, 2008, now Pat. No. 8,549,279.

(60) Provisional application No. 60/982,128, filed on Oct. 23, 2007.

(51) Int. Cl.

| | | |
|---|---|---|
| *H04L 29/06* | (2006.01) | |
| *G06Q 20/12* | (2012.01) | |
| *G06Q 20/24* | (2012.01) | |
| *G06Q 40/00* | (2012.01) | |

(52) U.S. Cl.
CPC ......... *G06Q 20/382* (2013.01); *G06Q 20/385* (2013.01); *G06Q 20/3829* (2013.01); *G06Q 40/00* (2013.01); *H04L 63/0807* (2013.01); *H04L 67/02* (2013.01); *H04L 2463/102* (2013.01)

(58) Field of Classification Search
USPC .......................................................... 705/39
See application file for complete search history.

(56) References Cited

U.S. PATENT DOCUMENTS

| | | | |
|---|---|---|---|
| 5,903,881 | A | 5/1999 | Schrader et al. |
| 5,960,411 | A | 9/1999 | Hartman et al. |
| 5,961,593 | A | 10/1999 | Gabber et al. |
| 5,978,918 | A | 11/1999 | Scholnick et al. |
| 6,070,165 | A | 5/2000 | Whitmore |
| 6,134,551 | A | 10/2000 | Aucsmith |
| 6,243,451 | B1 | 6/2001 | Shah et al. |
| 6,636,833 | B1 | 10/2003 | Flitcroft et al. |
| 6,802,007 | B1 | 10/2004 | Canelones et al. |
| 6,990,470 | B2 | 1/2006 | Hogan et al. |
| 7,899,706 | B1 | 3/2011 | Stone et al. |
| 7,979,351 | B1 | 7/2011 | Vollmer et al. |
| 2001/0034717 | A1 | 10/2001 | Whitworth |
| 2001/0034720 | A1 | 10/2001 | Armes |
| 2001/0044785 | A1 | 11/2001 | Stolfo et al. |
| 2002/0111907 | A1 | 8/2002 | Ling |
| 2002/0116341 | A1 | 8/2002 | Hogan et al. |
| 2002/0133467 | A1* | 9/2002 | Hobson et al. ................ 705/64 |
| 2003/0018567 | A1 | 1/2003 | Flitcroft et al. |
| 2003/0040973 | A1 | 2/2003 | Marks |
| 2003/0130958 | A1 | 7/2003 | Narayanan et al. |
| 2003/0200184 | A1 | 10/2003 | Dominguez et al. |
| 2003/0212642 | A1 | 11/2003 | Weller et al. |
| 2004/0024702 | A1* | 2/2004 | Angel et al. .................... 705/40 |
| 2004/0078276 | A1* | 4/2004 | Shimogori ...................... 705/26 |
| 2004/0133513 | A1 | 7/2004 | McCoy et al. |
| 2004/0139011 | A1 | 7/2004 | Kozee et al. |
| 2004/0255143 | A1 | 12/2004 | Wemyss et al. |
| 2005/0114272 | A1 | 5/2005 | Herrmann et al. |
| 2005/0177750 | A1 | 8/2005 | Gasparini et al. |
| 2005/0188005 | A1 | 8/2005 | Tune |
| 2005/0262355 | A1 | 11/2005 | Banet et al. |
| 2006/0020542 | A1* | 1/2006 | Litle et al. ...................... 705/40 |
| 2006/0076400 | A1 | 4/2006 | Fletcher |
| 2006/0081702 | A1 | 4/2006 | Nandakumar |
| 2006/0091223 | A1* | 5/2006 | Zellner et al. ................ 235/492 |
| 2006/0122943 | A1 | 6/2006 | Mann et al. |
| 2006/0149671 | A1 | 7/2006 | Nix et al. |
| 2006/0282372 | A1 | 12/2006 | Endres et al. |
| 2007/0130070 | A1 | 6/2007 | Williams |
| 2007/0162292 | A1 | 7/2007 | Bell et al. |
| 2007/0198433 | A1 | 8/2007 | McGee et al. |
| 2007/0288377 | A1 | 12/2007 | Shaked |
| 2008/0091944 | A1 | 4/2008 | von Mueller et al. |
| 2008/0104709 | A1 | 5/2008 | Averyt et al. |
| 2008/0208697 | A1 | 8/2008 | Kargman et al. |
| 2008/0243534 | A1* | 10/2008 | Mutlu ............................... 705/1 |
| 2009/0024471 | A1 | 1/2009 | Nielson et al. |
| 2009/0048953 | A1 | 2/2009 | Hazel et al. |
| 2009/0119222 | A1 | 5/2009 | O'Neil et al. |
| 2010/0023416 | A1 | 1/2010 | Floyd |
| 2010/0325053 | A1 | 12/2010 | Hogg et al. |
| 2011/0047593 | A1 | 2/2011 | Ausems et al. |

OTHER PUBLICATIONS

Office Action for U.S. Appl. No. 14/657,049 dated May 1, 2015.
Office Action for U.S. Appl. No. 14/657,086 dated May 11, 2015.
Office Action for U.S. Appl. No. 14/657,154 dated May 18, 2015.
Office Action for U.S. Appl. No. 14/657,172 dated May 18, 2015.
Office Action for U.S. Appl. No. 14/657,181 dated May 22, 2015.
Office Action for U.S. Appl. No. 14/657,135 dated Jun. 9, 2015.
Office Action for U.S. Appl. No. 14/657,100 dated Jul. 8, 2015.
Final Office Action for U.S. Appl. No. 14/657,154 dated Jun. 17, 2016.
Final Office Action for U.S. Appl. No. 14/657,172 dated Jun. 20, 2016.
Office Action for U.S. Appl. No. 13/969,059 dated Jul. 18, 2016.
Office Action for U.S. Appl. No. 14/657,049 dated Jul. 22, 2016.
Office Action for U.S. Appl. No. 14/657,100 dated Jul. 15, 2016.
Office Action for U.S. Appl. No. 14/657,135 dated Jul. 7, 2016.
"What is a Primary Key?—Definition from Techopedia", retrieved from https://www.techopedia.com/definition/5547/primary-key on Nov. 2, 2015, 3 pages.
Final Office Action for U.S. Appl. No. 14/657,100 dated Nov. 9, 2015.
Final Office Action for U.S. Appl. No. 14/657,135 dated Oct. 8, 2015.
Final Office Action for U.S. Appl. No. 14/657,049 dated Oct. 6, 2015.
Final Office Action for U.S. Appl. No. 14/657,086 dated Nov. 2, 2015.
Final Office Action for U.S. Appl. No. 14/657,154 dated Nov. 10, 2015.
Final Office Action for U.S. Appl. No. 14/657,172 dated Nov. 13, 2015.
Final Office Action for U.S. Appl. No. 14/657,181 dated Oct. 8, 2015.
Final Office Action for U.S. Appl. No. 14/657,100 dated Nov. 9, 2016.
Final Office Action for U.S. Appl. No. 13/969,059 dated Jan. 20, 2017.
Final Office Action for U.S. Appl. No. 14/657,049 dated Jan. 10, 2017.
Final Office Action for U.S. Appl. No. 14/657,135 dated Nov. 9, 2016.
Office Action for U.S. Appl. No. 14/657,154 dated Dec. 1, 2016.
Office Action for U.S. Appl. No. 14/657,172 dated Nov. 18, 2016.
Office Action for U.S. Appl. No. 14/657,181 dated Nov. 21, 2016.
Final Office Action for U.S. Appl. No. 14/657,086 dated Jan. 13, 2017.
Office Action for U.S. Appl. No. 14/657,086 dated Sep. 9, 2016.
Non-Final Rejection dated Jun. 30, 2017 for U.S. Appl. No. 14/657,086.
Non-Final Rejection dated Apr. 18, 2017 for U.S. Appl. No. 14/657,100.
Non-Final Rejection dated Apr. 14, 2017 for U.S. Appl. No. 14/657,135.
Final Rejection dated May 15, 2017 for U.S. Appl. No. 14/657,181.
Final Rejection dated May 11, 2017 for U.S. Appl. No. 14/657,172.
Final Rejection dated Apr. 10, 2017 for U.S. Appl. No. 14/657,154.
Non-Final Rejection dated Sep. 28, 2017 for U.S. Appl. No. 14/657,049.
Non-Final Rejection dated Oct. 12, 2017 for U.S. Appl. No. 14/657,181.
Non-Final Rejection dated Oct. 6, 2017 for U.S. Appl. No. 14/657,172.
Non-Final Rejection dated Jul. 27, 2017 for U.S. Appl. No. 14/657,154.
Final Rejection dated Oct. 26, 2017 for U.S. Appl. No. 14/657,135.
Final Rejection dated Oct. 24, 2017 for U.S. Appl. No. 14/657,100.

(56) References Cited

OTHER PUBLICATIONS

Final Rejection dated Dec. 27, 2017 for U.S. Appl. No. 14/657,086.

* cited by examiner

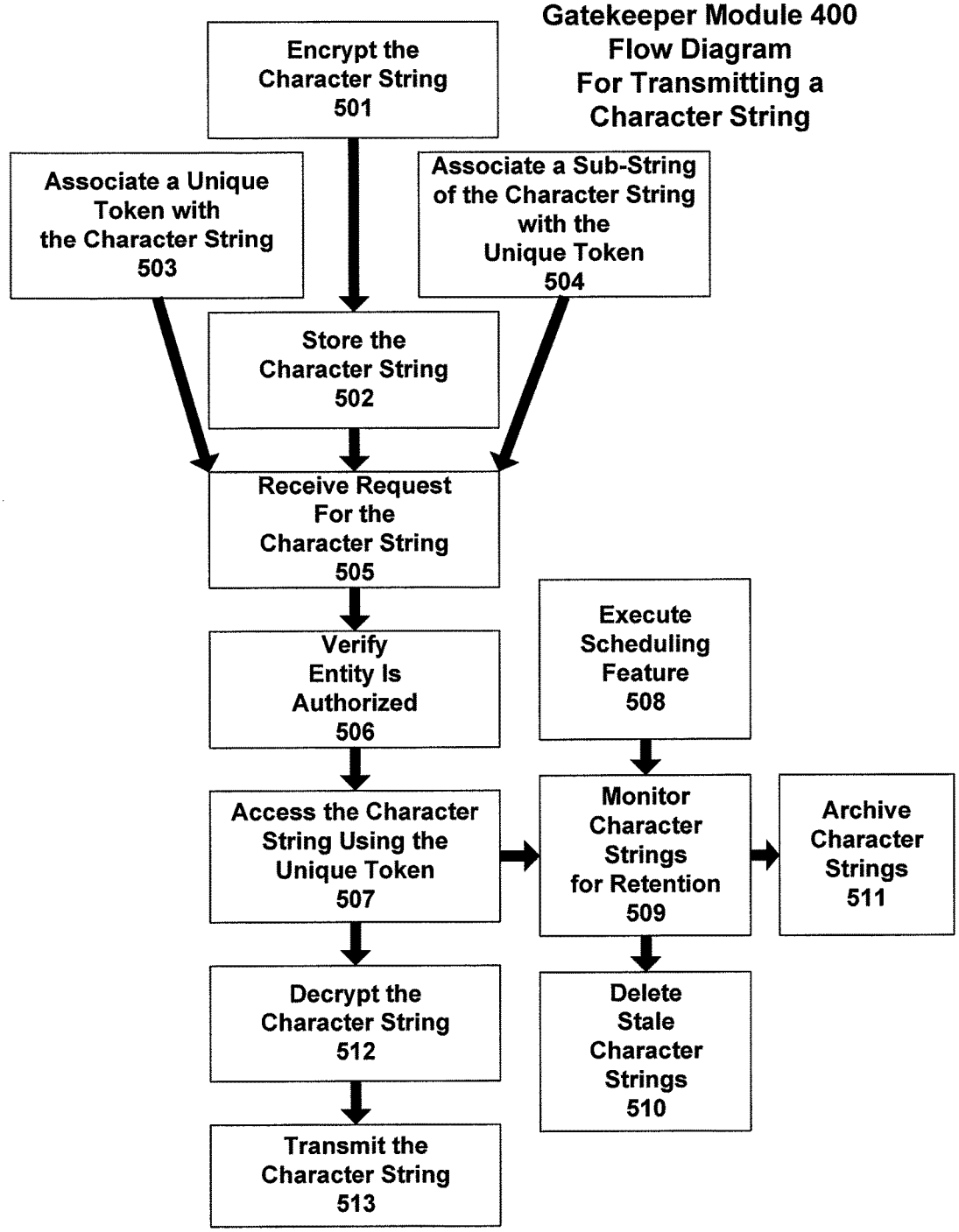

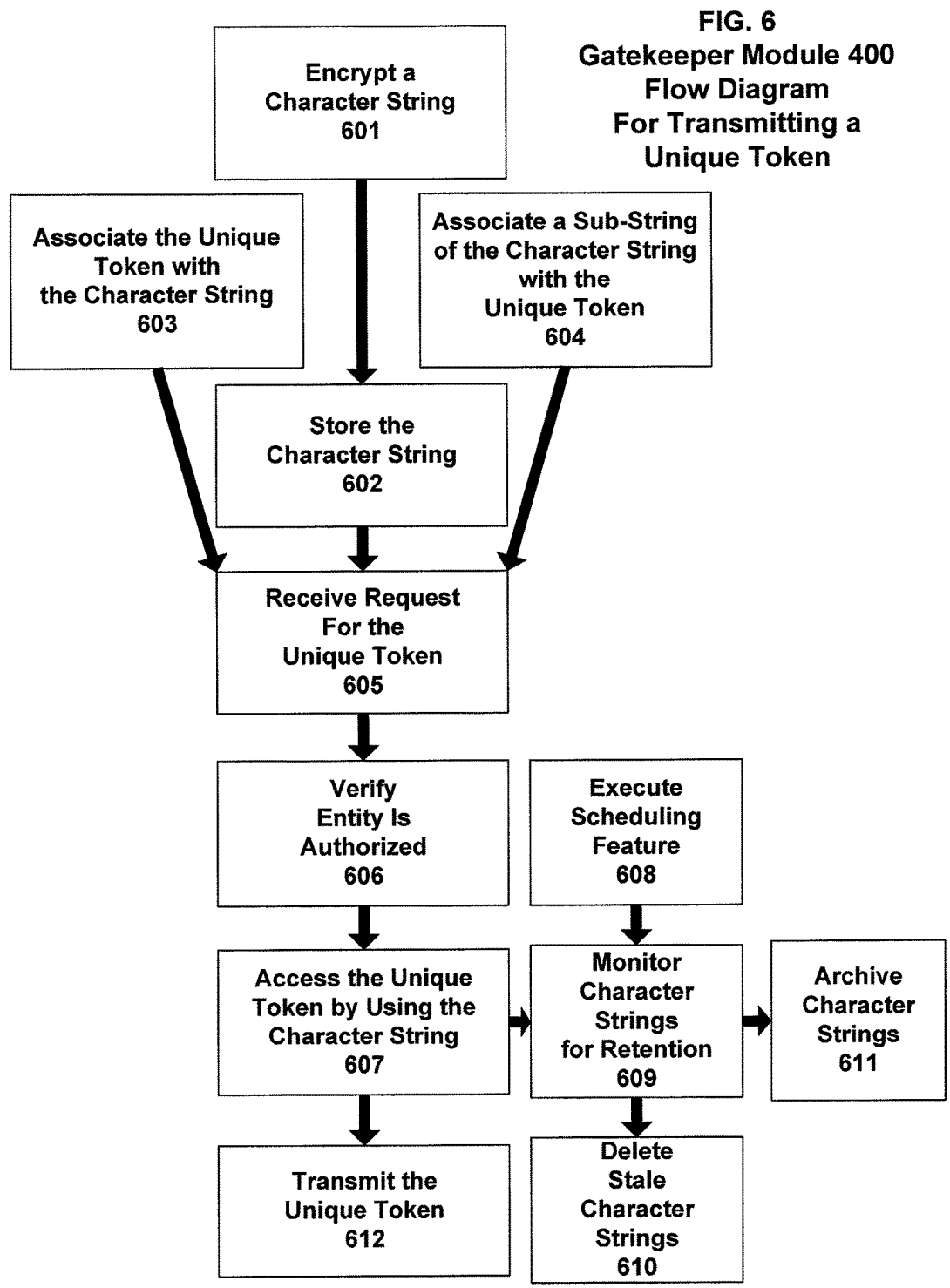

ENCRYPTION AND TOKENIZATION ARCHITECTURES

CROSS-REFERENCE TO RELATED APPLICATIONS

This application is a continuation of U.S. application Ser. No. 13/969,059, filed Aug. 16, 2013, which is a continuation of U.S. application Ser. No. 12/203,415 (now U.S. Pat. No. 8,549,279), filed Sep. 3, 2008 and issued Oct. 1, 2013, which claims the benefit of U.S. Provisional Application Ser. No. 60/982,128, filed Oct. 23, 2007. The contents of each of the above applications are incorporated herein by reference in their entireties.

FIELD OF THE INVENTION

Various embodiments of the present invention relate generally to methods and systems for encryption and tokenization architectures for sensitive data such as credit card number.

BACKGROUND OF THE INVENTION

In today's world of information storage, there are many circumstances wherein information must be securely stored and used. For example, many merchants and service providers accept credit cards for the payment of goods and services they sell. In order to accept a credit card for payment, a merchant or service provider will record a purchaser's credit card number along with other information, and submit the number and information for payment to the issuer of the credit card, such as Visa. In many cases this information is encrypted due to the sensitivity of the information and the threat of a third-party illegally obtaining the information, e.g., a hacker breaking into a merchant's computer system and illegally copying this information.

In addition, major credit card companies have developed guidelines to help merchant and service providers prevent credit card fraud, hacking, and various other security issues. These guidelines are known as the Payment Card Industry Data Security Standard (PCI DSS). Therefore, any merchant or service provider processing, storing, or transmitting credit card numbers must adhere to these standards or risk losing the ability to process credit card payments. These guidelines involve twelve requirements for compliance. For example, the guidelines require that any cardholder data stored must be protected. In addition, any transmission of cardholder data across open, public networks must be encrypted.

Encryption can be a complex process that involves encrypting and decrypting the cardholder data through the use of tools such as asymmetric-keys. For example, in public-key cryptography the encryption process involves using two keys, i.e., a public-key and a private key. The public key may be freely distributed, while its paired private key is kept secret. Typically, the public key is used for encrypting the data while the private key is used for decrypting the data. Therefore, these keys must be maintained and securely stored. Thus, every time a merchant or service provider transmits cardholder data, they must perform this encryption and decryption process. This can lead to inefficient processing of credit card payments.

As a result, a need exists in the art to better utilize sensitive information, yet minimize the transferring of such information. Such an improvement will also lead to better efficiency because the need for encrypting and decrypting will be reduced to use such information.

BRIEF SUMMARY OF THE INVENTION

Various embodiments of the present invention are directed to systems and methods for transmitting a character string. In addition, various embodiments are directed to systems and methods for transmitting a unique token associated with a character string.

In particular, various embodiments provide a method of transmitting a character string comprising the step of adapting one or more processors for executing a gatekeeper module. The gatekeeper module in these embodiments is adapted for: (a) storing the character string in one or more storage devices; (b) associating a unique token with the character string; and (c) associating a sub-string of the character string with the unique token to identify that the unique token is associated with the character string without revealing the character string. In addition, in response to receiving a request for the character string, the gatekeeper module is further adapted for accessing the character string from the one or more storage devices by using the unique token associated with the character string and transmitting the character string.

In various embodiments, the gatekeeper module is further adapted for verifying that a computer device or a user making the request for the character string is authorized to receive the character string. In addition, in various embodiments, the character string is stored as encrypted data and/or stored as a record in a database. Furthermore, in various embodiments, the character string is a credit card number and the associated sub-string used to identify the credit card number is the last four digits of the credit card number.

As another example, various embodiments of the present invention provide a method for transmitting a unique token associated with a character string comprising the step of adapting one or more processors for executing a gatekeeper module. In these embodiments, the gatekeeper module is adapted for: (a) storing the character string in one or more storage devices; (b) associating the unique token with the character string; and (c) associating a sub-string of the character string with the unique token to identify that the unique token is associated with the character string without revealing the character string. In addition, in response to receiving a request for the unique token associated with the character string, the gatekeeper module is further adapted for accessing the unique token from the one or more storage devices using the character string and transmitting the unique token associated with the character string. In various embodiments, the gatekeeper module is also adapted for verifying that a computer device or a user making the request for the unique token is authorized to receive the unique token.

Furthermore, various embodiments provide a system for transmitting a character string comprising one or more processors and one or more storage devices coupled to the processors and adapted for storing the character string. The processors of these particular embodiments are adapted to execute a gatekeeper module to (a) store the character string within the storage devices; (b) associate a unique token with the character string; and (c) associate a sub-string of the character string with the unique token to identify that the unique token is associated with the character string without revealing the character string. In addition, in response to receiving a request for the character string, the processors are further adapted to execute the gatekeeper module to access the character string from the storage devices by using the unique token associated with the character string and transmit the character string.

In various embodiments, the processors are also adapted to execute the gatekeeper module to verify that a computer device or a user making the request for the character string is authorized to receive the character string. In addition, in various embodiments, the character string is stored as encrypted data and/or stored as a record in a database within the storage devices.

Other embodiments provide a system for transmitting a unique token associated with a character string comprising one or more processors and one or more storage devices coupled to the processors and adapted for storing the character string. The processors of these particular embodiments are adapted to execute a gatekeeper module to: (a) store the character string within the storage devices; (b) associate a unique token with the character string; and (c) associate a sub-string of the character string with the unique token to identify that the unique token is associated with the character string without revealing the character string. In addition, in response to receiving a request for the unique token, the processors are further adapted to execute the gatekeeper module to access the unique token from the storage devices by using the character string associated with the unique token and transmit the unique token. In various embodiments, the processors are also adapted to execute the gatekeeper module to verify that a computer device or a user making the request for the unique token is authorized to receive the unique token.

In various embodiments, a method for conducting an online transaction on a website involving sensitive information is provided. In such embodiments, the method comprises: (a) registering at least one entity with a gate keeper module, the registering comprising associating the at least one entity with a subscription level; (b) associating a sub-string of a character string with a unique token so that a direct link does not exist between the unique token and the character string, the character string comprising the sensitive information and the sub-string being configured to identify the character string without revealing the sensitive information; and (c) during processing of the online transaction: (i) using the unique token for intermediate steps during the processing of the online transaction; and (ii) only accessing the character string in storage memory using the unique token and the sub-string to retrieve the sensitive information and to complete the online transaction using the information for the online transaction and the sensitive information after receiving a request for the sensitive information from at least one of the at least one registered entity associated with a subscription level associated with a privilege to receive the requested sensitive information.

In various embodiments, a system for conducting an online transaction on a website involving sensitive information is provided. In such embodiments, the system comprises one or more processors; and one or more storage devices coupled to the one or more processors and adapted for storing a character string. The one or more processors may execute a gatekeeper module to: (a) register at least one entity with the gatekeeper module, the registering comprising associating the at least one entity with a subscription level; (b) associate a unique token with a sub-string of a character string wherein a direct link does not exist between the unique token and the character string, the character string comprising the sensitive information and the sub-string being configured to identify the character string without revealing the sensitive information; and (c) during processing of the online transaction: (i) use the unique token for intermediate steps during the processing of the online transaction; and (ii) only access the character string in the one or more storage devices using the unique token and the sub-string-to retrieve the sensitive information and to complete the online transaction using the information for the online transaction and the sensitive information after receiving a request for the sensitive information from at least one of the at least one registered entity associated with a subscription level associated with a privilege to receive the requested sensitive information.

In yet other embodiments, a computer program product for conducting an online transaction on a website involving sensitive information, wherein the computer program product comprises at least one non-transitory computer-readable storage medium having computer-readable program code portions stored therein, is provided. In such embodiments, the computer-readable program code portions may comprise: (a) an executable portion configured to register at least one entity with the gatekeeper module, the registering comprising associating the at least one entity with a subscription level; (b) an executable portion configured to associate a unique token with a sub-string of a character string wherein a direct link does not exist between the unique token and the character string, the character string comprising the sensitive information and the sub-string being configured to identify the character string without revealing the sensitive information; and (c) during processing of the online transaction: (i) an executable portion configured to use the unique token for intermediate steps during the processing of the online transaction; and (ii) an executable portion configured to only access the character string in one or more storage devices using the unique token and the sub-string-to retrieve the sensitive information and to complete the online transaction using the information for the online transaction and the sensitive information after receiving a request for the sensitive information from at least one of the at least one registered entity associated with a subscription level associated with a privilege to receive the requested sensitive information.

BRIEF DESCRIPTION OF THE SEVERAL VIEWS OF THE DRAWINGS

Figure 1:
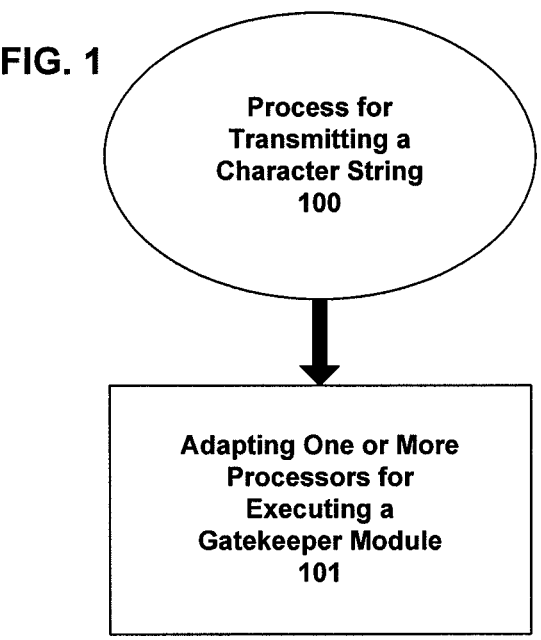

Having thus described the invention in general terms, reference will now be made to the accompanying drawings, which are not necessarily drawn to scale, and wherein:

FIG. 1 is a flowchart illustrating a process for transmitting a character string according to various embodiments of the invention.

Figure 2:
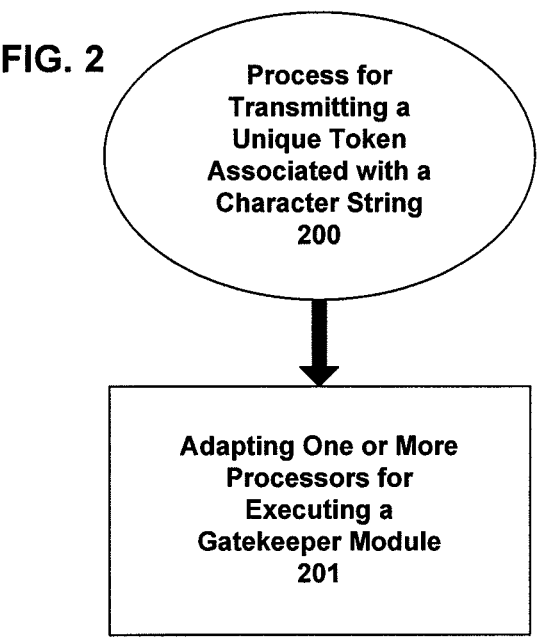

FIG. 2 is a flowchart illustrating a process for transmitting a unique token associated with a character string according to various embodiments of the invention.

Figure 3:
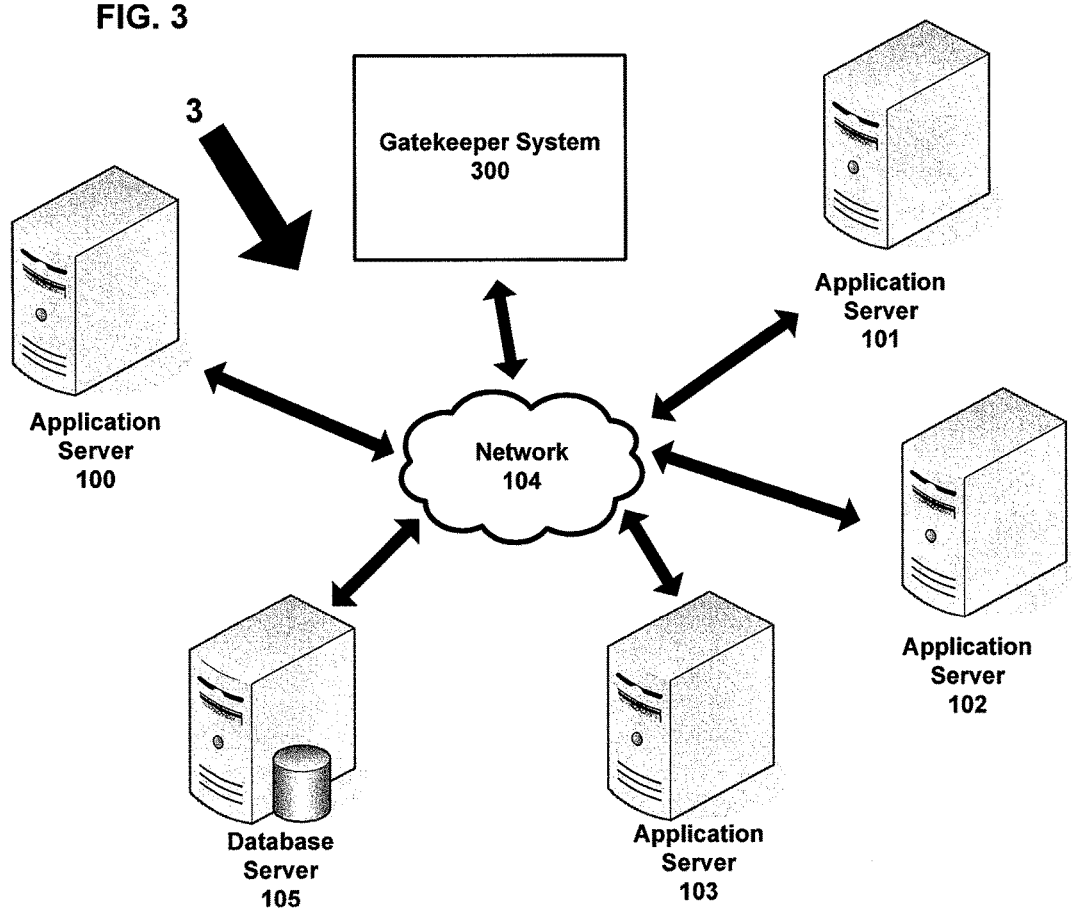

FIG. 3 is a schematic diagram illustrating a system architecture including a gatekeeper system according to various embodiments of the invention.

Figure 4:
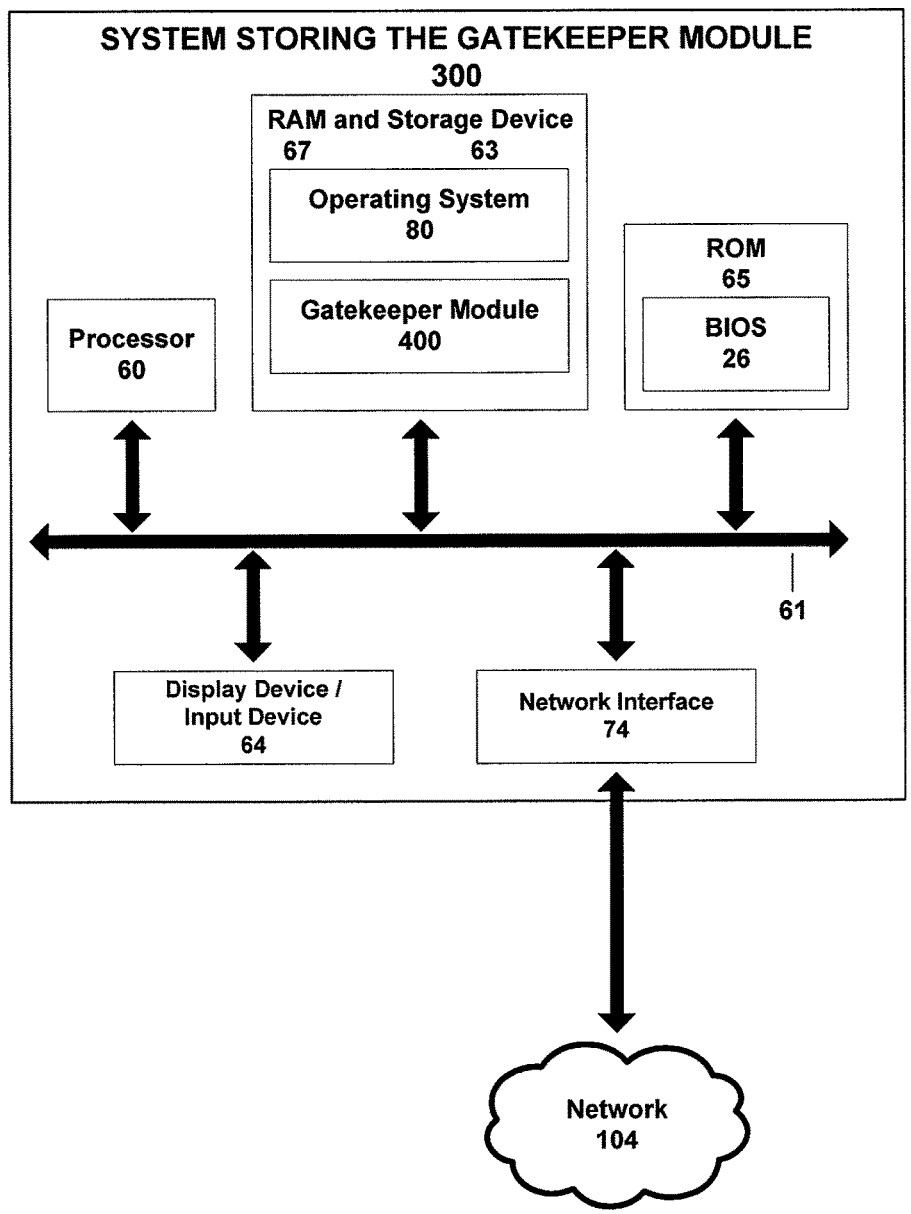

FIG. 4 is a schematic diagram illustrating a system storing a gatekeeper module according to various embodiments of the invention.

FIG. 5 is a flow diagram of a gatekeeper module transmitting a character string according various embodiments of the invention.

FIG. 6 is a flow diagram of a gatekeeper module transmitting a unique token associated with a character string according to various embodiments of the invention.

DETAILED DESCRIPTION OF THE INVENTION

The present invention will now be described more fully with reference to the accompanying drawings, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment, or an embodiment combining software and hardware aspects. Furthermore, the present invention may take the form of a computer program product on a computer-readable storage medium having computer-readable program instructions (e.g., computer software) embodied in the storage medium. More particularly, the present invention may take the form of web-implemented computer software. Any suitable computer-readable storage medium may be utilized including hard disks, CD-ROMs, DVD-ROMs, USB flash drives, optical storage devices, or magnetic storage devices.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Transmitting a Character String

Various embodiments of the present invention provide systems and methods for transmitting a character string. Such embodiments include providing a gatekeeper module that is executed on a computer to: (1) store a character string within one or more storage devices; (2) associate a unique token with the character string; (3) associate a sub-string of the character string with the unique token to identify that the unique token is associated with the character string without revealing the character string; and (4) in response to receiving a request for the character string, access the character string from the one or more storage devices by using the unique token associated with the character string, and transmit the character string to a computer device or a user requesting the string.

FIG. 1 is an exemplary process for transmitting a character string 100 according to various embodiments of the invention. The process comprises the step of adapting one or more processors ("processor") for executing a gatekeeper module, shown as Step 101. These processors may be located in one or more computer systems and may be in communication via a network (e.g., a LAN network, wireless network, or the Internet).

Thus, the processor executes the gatekeeper module of various embodiments to store the character string in one or more storage devices. For example, the processor may execute the gatekeeper module to store the character string in a database located on the storage devices. The processor may execute the gatekeeper module in other embodiments to store the character string in a file located on a storage device. Furthermore, the processor may execute the gatekeeper module to store the character string in other embodiments in a data warehouse, or some type of program module located on storage devices.

In addition, various types of storage devices may be used according to various embodiments of the invention. For instance, the storage devices may be internal or external hard drives, storage disks, magnetic tape, USB flash drives, or some other type of storage devices as known by those of ordinary skill in the art.

In many cases the character string represents sensitive information, and therefore, the processor will execute the gatekeeper module to store the string as encrypted data in various embodiments. For example, the character string may be a customer credit card number that is received by a merchant or service provider from a customer purchasing a product or service by using a credit card. In this context, the merchant or service provider records the credit card number along with other information associated with the credit card and customer so that the credit card information can be submitted to the issuer of the credit card for payment.

Furthermore, the storing of credit card information has become even more predominate in the advent of online shopping via the Internet. For example, a user will visit a retailer's web site via a browser located on the user's computer, browse the retailer's products, select one or more products for purchase, and in many cases, proceed to a "checkout" webpage provided by the retailer's web site to complete the purchase. Once on the "checkout" webpage, the user provides credit card information by typing in the information on the webpage to pay for the selected products. A server will execute a module associated with the webpage to store the credit card information and complete the purchase. In addition, in many instances a user will visit the retailer's web site multiple times to shop again. As a result, the retailer may retain the user's credit card information in one or more storage devices to help facilitate a quicker checkout for the user for subsequent purchases, e.g., the user's credit card information may be automatically populated on the "checkout" webpage so that the user is not required to re-enter the information for a subsequent purchase.

Other types of sensitive information may also be stored in the storage devices as encrypted data. For example, many organizations store social security numbers for various reasons and will encrypt the social security numbers for security purposes. However, the credit card example is utilized throughout this document to illustrate the various embodiments of the present invention. Thus, it should be understood that the credit card example is used for illustration purposes only and in no way should limit the specific kind of sensitive data that may be used with the claimed invention.

Returning to the example, in various embodiments, the processor executes the gatekeeper module to receive a customer's credit card number, encrypt the number, and store the number in a database. In addition to the credit card number, the gatekeeper module may store various other information in the database, such as credit card expiration date, credit card type, status of the credit card (e.g., active), parent system, and profile flag. In various embodiments, the processor may execute the gatekeeper module to use various encryption techniques to encrypt the credit card number and information. For example, the module may employ asymmetric-key encryption to encrypt the credit card number. Asymmetric-key encryption involves the use of keys to encrypt or decrypt the information. A common type of asymmetric-key encryption is known as public-key encryption. This type of encryption involves the use of two different keys, i.e., a public key and a private key. The public key is freely distributed and is typically used for encryption, while the private key is kept secured and is typically used for decryption.

Lastly, the storage devices used to the store the character strings may be provided as a centralized repository according to various embodiments of the invention. Such a repository may be important in the context of storing sensitive information such as credit card numbers. For example, those managing the repository can implement corrective measures more quickly by having a centralized repository to store the credit card numbers in the case of a security breach. In addition, such a repository centralizes the protection of the sensitive information, and therefore, raises the quality of protection because implementing protective and corrective measures is much simpler for a centralized repository as opposed to many repositories. Thus, a centralized repository reduces the scope of the information that must be protected, reduces security efforts, and reduces the labor and overhead required to protect the information.

Furthermore, a centralized repository aids in the compliance with Payment Card Industry Data Security Standard (PCI DSS) guidelines used in the context of credit card information. For example, the centralized repository assists in logging compliance with PCI DSS guidelines because such logging deals with only one source of credit card information. In addition, it is easier to restrict access to the repository because it is easier to pre-define and manage a list of entities that may access the repository, as well as, track and monitor those entities that have accessed the repository. It is also easier to restrict physical access to the credit card information because the centralized repository can be housed on one system, e.g., one server or bank of servers, and access to this system can be restricted.

In various embodiments, the processor also executes the gatekeeper module to associate a unique token with the character string. Returning to the example, the module stores the encrypted credit card number in the database and assigns a unique token to the encrypted credit card number.

The processor executes the gatekeeper module to create the unique token using various processes. For example, in various embodiments, the module creates the unique token by calling a random number generator module. Such a module typically includes an algorithm that can automatically create long runs, e.g., millions of numbers long, with good random properties. However, in many cases, the sequence created by the algorithm will eventually repeat. Therefore, once the random number generator module has provided a random number, the processor further executes the gatekeeper module to check the provided number against the existing tokens to ensure the acquired random number is unique. If the random number is unique, the processor executes the gatekeeper module to associate the random number with the encrypted credit card number in the database.

In other embodiments, the processor executes the gatekeeper module to employ database primary keys used to distinguish records in a database table to provide unique tokens. For example, a record stored in the table of a database may be made a unique record with respect to other records stored in the same table by requiring that one or more fields of the record, alone or in combination, store a unique value from the same one or more fields of other records stored in the table. This is referred to as developing primary keys to one of ordinary skill in the art. In addition, many commercial database applications also provide a feature that will allow a field in a database table to be defined so that a unique primary key is automatically generated and written into the field for a new record stored in the table. Thus, in the example, this feature generates a unique primary key to store in a field of a table in the database when the processor executes the gatekeeper module to store the encrypted credit card number in the table. The module will then use the generated primary key as the unique token associated with the credit card number.

In various embodiments, the processor executes the gatekeeper module to store the unique token in the same storage as the character string. In other embodiments, the processor executes the gatekeeper module to store the unique token in separate storage. Thus, in the example, the processor executes the gatekeeper module to store the unique token in the same database as the encrypted credit card number or in a separate database.

The decision as to whether to store the unique tokens in the same database as the encrypted credit card numbers or in a separate database may be based on different considerations. For example, the processor may execute the gatekeeper module in various embodiments to store the unique tokens separately from the encrypted information for security reasons. In other instances, the processor may execute the gatekeeper module to store the unique tokens in the same database as the encrypted information to help centralize the information for management purposes. One of ordinary skill in the art can think of various other reasons to store the tokens and the character strings in the same or separate storage devices in light of this disclosure.

In addition, in various embodiments, the processor executes the gatekeeper module to associate the unique token with a sub-string of the character string associated with the token to identify that the token is associated with the character string without revealing the character string. In various embodiments, the processor executes the gatekeeper module to store this sub-string along with its corresponding token. In other embodiments, the processor executes the gatekeeper module to store the sub-string and token in separate storage. Thus, there is nothing identifiable in the token to link the token to the corresponding character string directly. Instead, the token uses a formal protected cross reference to link to the character string.

An example of such a sub-string is the last four digits of a credit card number. Therefore, if a user visiting a retailer's web site proceeds to the "checkout" webpage to purchase a product, the user can request to see what credit cards the merchant has on file for the user, e.g., what credit card numbers are stored in the retailer's database. In various embodiments, a server executes a module associated with the web page to query the database and instead of processor returning the actual credit card numbers to the module, the processor executes the gatekeeper module to return the tokens associated with the stored credit card numbers along with the last four digits of each credit card number stored in the database. The server then executes the module to display the last four digits of each credit card on the web site to the user. As a result, the user is able to recognize each stored credit card number and choose the credit card to which he or she wishes to charge the purchase.

The use of such a sub-string provides a significant advantage over previous processes. This is because to show the user what credit card numbers are stored in the database in previous processes, a module would need to be executed to query the database for the credit card numbers, encrypt the credit card numbers if the numbers were decrypted to be queried from the database, send the numbers to the webpage for displaying, and decrypt the numbers to display them to the user. This complex process is required to be performed in this fashion to ensure the security of the information from such threats as hackers, as well as, to be in compliance with the PCI DSS guidelines.

However, by having the module display the sub-strings to identify particular credit card numbers instead of the actual credit card numbers on the webpage, the user can view what credit card numbers are stored in the database for him or her without the module having to perform the complex process to access and transmit the actual credit card numbers to the webpage. As a result, the credit card numbers stay encrypted and secured in the database. Thus, encryption and decryption activities are minimized and the flow of sensitive information is reduced.

Accordingly, in response to the gatekeeper module receiving a request for a character string, the processor executes the gatekeeper module to access the string from storage by using the unique token associated with the character string. Therefore, returning to the example, once the user has selected a particular credit card number to which he or she wishes to charge the purchase from the last four digits displayed on the "checkout" webpage, the module that is executed to facilitate the purchase from the webpage sends a request for the specific credit card number to the gatekeeper module. In response, the processor executes the gatekeeper module to access the actual credit card number by using the unique token associated with the requested credit card number. For example, the processor executes the gatekeeper module to query the actual credit card number from the repository by using the unique token as a search parameter of the query.

In various embodiments, various computer devices and users may submit the request for the character string, and at various times. For example, once the user selects a particular credit card to which to charge the purchase, a server executes the module to facilitate the purchase to save the purchase to a database. A computer device may later batch this purchase with other purchases and submit the purchases to a credit card company for payment. In this case, the server executes the module to save the unique token for the selected credit card along with the purchase in the database and the device that executes the module to perform the batching is the device that requests the actual credit card number by using the token. This also provides an advantage over previous processes because in a process that involves multiple transactions, a number of computer devices executing the modules involved in the transactions may only need a reference to the credit card number as opposed to the actual credit card number. In this case, these devices will use the token to process transactions unless there is a specific reason the device needs the actual credit card number, such as submitting the purchase information to the credit card company for payment.

In addition, the processor executes the gatekeeper module of various embodiments to verify whether the device or the user requesting the character string is authorized to receive the character string. Thus, the module provides formal access controls in various embodiments. For example, the gatekeeper module may include an application programming interface (API) to regulate the interaction between independent computer devices and individuals and the database storing the sensitive information according to various embodiments of the invention. Specifically, a computer device or a user that makes a request to access a character string must first register with the gatekeeper module. Therefore, in the case of the credit card example, a mechanism is implemented to control who and what can access the credit card numbers in the database.

In various embodiments, the device or the user subscribes with the gatekeeper module to gain access to the information stored in the database. As a result, the processor will execute the gatekeeper module to give various devices and users various levels of access. For example, the computer device executing the batching module discussed above that batches up the credit card charges and submits the charges to the credit card company subscribes with the gatekeeper module to be able to request the credit card numbers. Another device that records and reports a user's transaction history may only need to retrieve the sub-strings associated with the tokens to display a user's transaction history, and therefore, this device's subscription only provides access to the sub-strings. In turn, the processor may execute the gatekeeper module to provide other subscription levels, such as privileges to access tokens only, according to various other embodiments.

Thus, the device or the user will need to provide a token, a sub-string, or some other information and sufficient credentials that allow the device or the user to perform the type of access or manipulation of the information the device or the user wants to perform. In various embodiments, the credentials may take many forms. For example, the processor may execute the gatekeeper module to provide the credentials as a key to the device upon registration with the gatekeeper module. In other embodiments, the processor may execute the gatekeeper module to provide credentials by simply checking the name of the device or the user against a record in a database table to determine whether the device or the user has privilege to perform the request. One of ordinary skill in the art can think of numerous ways for the processor to execute the gatekeeper module to provide and check credentials for a device or a user to establish the device's or the user's level of access to the information in light of this disclosure.

In addition, the processor can execute the gatekeeper module to monitor the retention of the character strings and associated information stored in the storage devices in various embodiments. Therefore, the processor can execute the gatekeeper module to determine whether any of the sensitive information stored is out-dated and should be deleted or archived from the database. As a result, this will minimize the amount of sensitive information stored in the storage devices and also minimize the liability of storing such information.

Thus, returning to the example wherein the database is storing the credit card numbers of users who have visited a retailer's web site to purchase goods from the retailer, the processor executes the gatekeeper module to periodically check to determine whether any of the credit card numbers have expired or whether any of the credit card numbers have not been used within a set period of time, e.g., whether a certain period of time has elapsed since the credit card number was last used to make a purchase. Therefore, if a credit card number has expired or has not been used within the set period of time, the processor executes the gatekeeper module to delete the credit card number along with any corresponding information from the database. In various embodiments, the processor may first execute the gatekeeper module to archive the credit card number and corresponding information to an external storage medium, such as a disk or tap drive, before deleting the information.

The processor can execute the gatekeeper module to monitor the character strings through various techniques. In one embodiment, the gatekeeper module may have a scheduling feature executed by the processor to check each record in the database at a certain time each day to determine if any credit card numbers need to be purged from the database. For example, the processor executes the scheduling feature every morning at three o'clock a.m. and filters out any records that need to be purged from the database. In another embodiment, the processor simply executes the gatekeeper module to check each credit card number stored for a user in response to the module receiving a request for a credit card number associated with the user to determine if any of the user's stored credit card numbers are out of date. One of ordinary skill in the art can envision several techniques that may be employed to ensure the out-dated character strings and corresponding information are purged in light of this disclosure.

Finally, processor executes the gatekeeper module to transmit the character string to the device or the user requesting the string according to various embodiments of the invention. It should be understood that the term "transmit" does not necessarily mean the gatekeeper module sends the character string to the device or the user. For example, in various embodiments, the processor executes the gatekeeper module to grant the device or the user permission to access the character string in storage. Thus, the term "transmit" is used in this disclosure to mean that the processor executes the gatekeeper module to facilitate the device or the user obtaining the character string.

As previously discussed, the device or the user making the request can vary by embodiment. For example, the device may be a server executing a program module, a Graphical User Interface (GUI), or an external source such as a credit card company computer system. In addition, the processor may execute the gatekeeper module to transmit the character string in various forms. For example, processor may execute the gatekeeper module to return the character string in a digital format such as in a data stream, a file, or an e-mail or to display the character string on a computer monitor. The processor may also execute the gatekeeper module to encrypt or decrypt the character string, or simply return the string as standard text. One of ordinary skill in the art is familiar with the numerous ways the character string can be returned from the storage devices and stored or displayed in light of this disclosure.

Transmitting a Unique Token Associated with a Character String

In many instances, a device or a user may need to access a unique token associated with a character string. For instance, a user may visit a retailer's web site and select a product to purchase. The module executed to facilitate the purchase on the web site forwards the user to a "checkout" webpage and instead of choosing an existing credit card number stored in the retailer's database, the user enters a new credit card number and completes the purchase. A server executes the module to record the purchase transaction in a database so that the purchase may be later submitted to the credit card company for payment. However, in this case, the module is provided with the credit card number as opposed to a unique token associated with the credit card number. Therefore, the server executes the module to obtain a unique token for the credit card number prior to storing the purchase transaction in the database.

Accordingly, various embodiments of the present invention are directed to systems and methods for transmitting a unique token associated with a character string. Such embodiments include providing a gatekeeper module that is executed on a computer to: (1) store the character string within one or more storage devices; (2) associate a unique token with the character string; (3) associate a sub-string of the character string with the unique token to identify that the unique token is associated with the character string without revealing the character string; and (4) in response to receiving a request for the unique token associated with the character string, access the unique token from the one or more storage devices by using the character string, and transmit the unique token to a computer device or a user requesting the unique token.

As displayed in FIG. 2, an exemplary process for transmitting a unique token associated with a character string 200 according to various embodiments of the invention includes the step of adapting one or more processors ("processor") for executing a gatekeeper module, shown as Step 201. These processors may be located in one or more computer systems and may be in communication via a network (e.g., a LAN network, a wireless network, or the Internet).

The processor executes the gatekeeper module of various embodiments to store the character string in one or more storage devices, as shown in Step 201. The processor executes the gatekeeper module to perform this step in the same manner as in the process for transmitting a character string 100. For example, the processor executes the gatekeeper module to store the character string in a database, file, data warehouse, or some type of program module according to various embodiments of the invention. In addition, in various embodiments, the character string may represent sensitive information, and therefore, the processor executes the gatekeeper module to store the string as encrypted data. Lastly, the processor may execute the gatekeeper module to store the character string in a central repository according to various embodiments of the invention.

The processor further executes the gatekeeper module to associate a unique token with the character string according to various embodiments. The processor executes the gatekeeper module to carry out this step in a similar manner to the process for transmitting a character string 100 discussed above. Thus, the processor executes the gatekeeper module to generate a unique token through various processes such as executing a random number generator module or utilizing the primary key associated with a record stored in a database for the character string.

In addition, in various embodiments, the processor executes the gatekeeper module to associate the unique token with a sub-string of the character string associated with the token in order to identify that the token is associated with the character string without revealing the character string in a manner similar to the process for transmitting a character string 100. An example of such a sub-string is the last four digits of a credit card number.

In various embodiments, the processor also executes the gatekeeper module to access a unique token from storage by using the character string associated with the unique token in response to receiving a request for the unique token according to various embodiments. Returning to the example, once the user has entered the credit card information on the "checkout" webpage and completed the transaction, the processor executes the gatekeeper module to encrypt and save the credit card number and related information to the database. In addition, the processor executes the gatekeeper module to generate and associate a unique token with the character string. In conjunction, a batching module is executed to send a request for the unique token associated the specific credit card number and the processor executes the gatekeeper module to access the token via the credit card number. The processor executes the gatekeeper module to return the unique token associated with the credit card number to the batching module and the batching module is executed to save the purchase transaction in a database along with the token as opposed to the new credit card number.

As in the case of the process for transmitting a character string 100, the processor also executes the gatekeeper module of process 200 to verify whether the computer device or the user requesting the unique token is authorized to receive the token according to various embodiments of the invention. Thus, the processor executes the gatekeeper module to provide formal access controls in various embodiments to verify that the device or the user making the request has privilege to retrieve the unique token. These formal access controls are similar to the controls discussed above in regard to the process for transmitting a character string 100.

Furthermore, in various embodiments, the processor executes the gatekeeper module to transmit the unique token to the device or the user requesting the token. Again, it should be understood that the term "transmit" does not necessarily mean the processor executes the gatekeeper module to send the token to the entity. For example, in various embodiments, the processor may execute the gatekeeper module to grant the device or the user permission to access the token in storage. Thus, the term "transmit" is used in this disclosure to mean that the gatekeeper module facilitates the device or the user obtaining the token.

As previously discussed, the device making the request can vary by embodiment. For example, the device may be a server executing a program module, a GUI, or an external source such as a credit card company computer system. In addition, the processor may execute the gatekeeper module to transmit the token in various forms. For example, the processor may execute the gatekeeper module to simply return the token in a digital format such as in a data stream, a file, or an e-mail or to display the token on a computer monitor. One of ordinary skill in the art is familiar with the numerous ways information can be returned from the storage devices and stored or displayed in light of this disclosure.

System Architecture

System 3 includes a gatekeeper system 300 according to various embodiments of the invention is shown as FIG. 3. As may be understood from this figure, in various embodiments, the system includes in addition to the gatekeeper system 300, a database server 105, and one or more application servers 100-103 that are connected via a network 104 (e.g., a LAN, a wireless network, the Internet, and/or a private network) to communicate with one another. In one embodiment of the invention, the gatekeeper system 300 is configured for retrieving data from, and storing data to, a database located on the database server 105 (or, alternatively, located on the gatekeeper system 300). In alternative embodiments, the system 3 may include more than one database. In other embodiments, the gatekeeper system 300 may be one or more computers or software programs running on one or more computers.

FIG. 4 shows a schematic diagram of a gatekeeper system 300 storing the gatekeeper module 400 according to one embodiment of the invention. The system 300 includes a processor 60 that communicates with other elements within the server via a system interface or bus 61. Also included in the system 300 is a display device/input device 64 for receiving and displaying data. This display device/input device 64 may be, for example, a keyboard or pointing device that is used in combination with a monitor. The system 300 further includes memory, which includes both read only memory (ROM) 65 and random access memory (RAM) 67. The system's ROM 65 is used to store a basic input/output system 26 (BIOS), containing the basic routines that help to transfer information between elements within the system 300. Alternatively, the system 300 can operate on one computer or on multiple computers that are networked together.

In addition, the system 300 includes at least one storage device 63, such as a hard disk drive, a floppy disk drive, a CD ROM drive, a DVD ROM drive, a USB flash drive, or optical disk drive, for storing information on various computer-readable media, such as a hard disk, a removable magnetic disk, a CD-ROM disk, or a DVD-ROM disk. As will be appreciated by one of ordinary skill in the art, each of these storage devices 63 is connected to the system bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, memory sticks, digital video disks, and Bernoulli cartridges.

A number of program modules may be stored by the various storage devices and within RAM 67. For example, as shown in FIG. 4, program modules of the system 300 include an operating system 80 and a gatekeeper module 400. The gatekeeper module 400 controls certain aspects of the operation of the system 300, as is described in more detail below, with the assistance of the processor 60 and an operating system 80.

Also located within the system 300 is a network interface 74, for interfacing and communicating via a network 104 (e.g., a LAN, a wireless network, the Internet, or a private network) with other elements of a computer network, such as application servers 100-103 and a database server 105 as shown in FIG. 3. It will be appreciated by one of ordinary skill in the art that one or more of the system's components 300 may be located geographically remotely from other system components. Furthermore, one or more of the components may be combined, and additional components performing functions described herein may be included in the system 300.

Exemplary System Operation

As mentioned above, the system 3 according to various embodiments enables communication between the gatekeeper system 300, the application servers 100-103, and the database server 105. In particular, in various embodiments, the gatekeeper system 300 includes a gatekeeper module 400. The gatekeeper module 400 may be configured to communicate information between one or more application servers 100-103 and a database server 105. This module 400 is discussed in more detail below.

Gatekeeper Module

FIG. 5 illustrates a flow diagram related to a gatekeeper module 400 transmitting a character string according to various embodiments of the invention. This flow diagram may correspond to the steps carried out by a processor 60 in the system 300 shown in FIG. 4 as it executes the gatekeeper module 300 in the RAM memory 67 of the system 300.

In various embodiments, the processor 60 executes the gatekeeper module 400 to initially obtain a character string from an entity such as a computer device or a user. However, it should be understood that the gatekeeper module 300 is not the only component that may be executed to receive the character string to store the string in one or more storage devices. For example, when the "checkout" webpage previously discussed receives a new credit card number from a user, the webpage may call a dedicated module that is executed besides the gatekeeper module 400 to save the credit card number to the database. One of ordinary skill in the art can envision numerous ways to set up a system to save new character strings to the database in light of this disclosure.

In addition, the entity from which the character string is obtained may be a GUI, a program module running on a computer system, or other component such as a third-party computer system according to various embodiments of the invention. The term "obtain" is used to mean receive or access. This can be accomplished either locally or remotely and may be via a communications network (e.g., a LAN, a wireless network, the Internet, or a private network).

Accordingly, the processor 60 executes the gatekeeper module 400 to store the character string in storage if the module 400 does receive the character string, shown as Step 502. In various embodiments, the processor 60 executes the gatekeeper module 400 to store the character string in a database. However, it should be understood by those of ordinary skill in the art that the gatekeeper module 400 does not necessarily need to store the character string in a database. For example, in various embodiments, the processor 60 may execute the gatekeeper module 400 to store the character string in a file, data warehouse, or some type of program module.

In addition, various types of storage devices may be used according to various embodiments of the invention. For instance, the storage devices may be internal or external hard drives, storage disks, magnetic tapes, USB flash drives, or some other type of storage device as known by those of ordinary skill in the art.

In many cases the character string represents sensitive information, and therefore, the processor 60 executes the gatekeeper module 400 to encrypt the character string (shown as Step 501) and to store the string as encrypted data according to various embodiments. For example, the character string may be a customer credit card number that is received by a merchant or service provider from a customer purchasing a product or service using a credit card.

In various embodiments, the processor 60 executes the gatekeeper module 400 to perform the encryption process or executes a different module to perform the encryption of the information if the information does need to be encrypted. Thus, the gatekeeper module 400 or other module may employ various techniques to encrypt the credit card number and information, such as asymmetric-key encryption.

In addition, the processor 60 executes the gatekeeper module 300 of various embodiments to obtain additional information to store in the database that is related to the credit card number. Such information may include credit card expiration date, credit card type, status of the credit card (e.g., active), parent system, and profile flag.

Lastly, the processor 60 may execute the gatekeeper module 400 to store the character string in a centralized repository according to various embodiments of the invention. Such a repository may be important in the context of storing sensitive information such as credit card numbers, as previously discussed. For example, the processor 60 can execute the gatekeeper module 400 or other computer modules to take corrective measures more quickly in the case of a security breach because the processor only needs to implement the measures on a centralized repository. In addition, the processor 60 can execute the gatekeeper module 400 or other computer modules to implement protective and corrective measures more easily since the character strings and corresponding information are stored in a centralized repository. As a result, the quality of protection is raised.

In various embodiments, the processor 60 executes the gatekeeper module 400 to associate a unique token to the character string in addition to storing the character string in the database, shown as Step 503. Thus returning to the example, the processor 60 executes the gatekeeper module 400 to store the encrypted credit card number in the database and also to create and to assign a unique token to the encrypted credit card number. Again, it should be apparent to one of ordinary skill in the art that in other embodiments other computer modules, besides the gatekeeper module 400, may perform this task in light of this disclosure. Preferably, the module that is facilitating the saving of the character string to storage also associates the unique token to the string.

The processor 60 may execute the gatekeeper module 400 (or other module) to create the unique token using various procedures. For example, in various embodiments, the processor 60 executes the gatekeeper module 400 to create the unique token by calling a random number generator module. Random number generator modules typically include an algorithm that can automatically create long runs, e.g., millions of numbers long, with good random properties, however in many cases, the sequence created by the algorithm will eventually repeat. Therefore, once the random number generator module has provided a random number, the processor 60 executes the gatekeeper module 400 to check the provided number against the existing tokens to ensure the acquired random number is unique. The processor 60 executes the gatekeeper module 400 to assign the random number to the encrypted credit card number if the random number is unique. The processor 60 executes the gatekeeper module 400 to discard the random number and re-calls the random number generator module if the random number is not unique.

Another procedure the gatekeeper module 400 may use in various embodiments to provide unique tokens is to employ database primary keys used to distinguish records in the table of a database. As previously discussed, many commercial database applications include a feature that will allow a field to be defined for a table so that a unique primary key is automatically generated and written into the field for a new record stored in the table. Thus, in the example, when the processor 60 executes the gatekeeper module 400 to store the encrypted credit card number in a table of a database, the database automatically generates a unique primary key and stores the key in the designated field. The processor 60 then executes the gatekeeper module 400 to use this primary key as the unique token associated with the credit card number.

In various embodiments, the processor 60 executes the gatekeeper module 400 to store the unique token in the same storage as the character string. In other embodiments, the processor 60 executes the gatekeeper module 400 to store the unique token in separate storage. Thus, in the example, the processor 60 executes the gatekeeper module 400 to store the unique token in the same database as the encrypted credit card number or in a separate database.

In addition, in various embodiments, the processor 60 executes the gatekeeper module 400 to associate a sub-string of the character string with the token in order to identify that the token is associated with the character string without revealing the character string, shown as Step 504. In various embodiments, the processor 60 executes the gatekeeper module 400 to store this sub-string along with its corresponding token. In other embodiments, the processor 60 executes the gatekeeper module 400 to store the sub-string and token in separate storage. Thus, there is nothing identifiable in the token to link the token to the corresponding character string directly. Instead, the token uses a formal protected cross reference to link to the character string. An example of such a sub-string is the last four digits of a credit card number.

The use of such a sub-string provides a significant advantage over previous systems. This is because for a previous system to show a user what credit card numbers are stored in the database, the previous system is required to query the database to obtain the credit card numbers, encrypt the credit card numbers if the credit card numbers were decrypted in order to be queried from the database, send the encrypted credit card numbers to a display, such as a webpage, and decrypt the credit card numbers in order to display the numbers to the user. This complex system is required to ensure the security of the information from such threats as hackers, as well as, be in compliance with the PCI DSS guidelines.

However, in a system 300 that facilitates displaying the stored credit card numbers using a sub-string in conjunction with a token, instead of the actual credit card numbers, the user can view what credit card numbers are stored in the database for him or her without the system 300 actually having to access and transmit the credit card numbers to the display. Therefore, the credit card numbers stay encrypted and secured in the database. As a result, encryption and decryption activities are minimized and the flow of sensitive information is reduced.

In Step 505, the processor 60 executes the gatekeeper module 400 to receive a request for the character string, and in response, the processor 60 executes the gatekeeper module 400 to access the string from storage using the unique token associated with the character string according to various embodiments (shown as Step 507). The request can be made at various times and from various entities.

For example, a user may select a particular credit card displayed on the "checkout" webpage to which to charge a purchase and may complete the transaction by selecting the "buy now" button on the page. As previously discussed, a batching module is executed to save the purchase to a database so that the module can later batch the purchase with other purchases made and submitted the purchases to the credit card company for payment. In addition, the batching module is also executed to submit a request to the gatekeeper module 400 for the unique token associated with the credit card number selected by the user to save the token along with the purchase in the database. This provides an advantage over previous systems because by system modules using the unique token instead of the actual credit card number, the credit card number is not exposed to needless risk and the system is not required to perform the complex processing of encrypting and decrypting the credit card information to facilitate the transaction.

In addition, the processor 60 may also execute the gatekeeper module 400 to verify whether the entity requesting the character string is authorized to receive the character string according to various embodiments of the invention, shown as Step 506. Thus, the gatekeeper module 400 is provided with formal access controls in various embodiments. For example, the gatekeeper module 400 may comprise an application programming interface (API) executed by a computer to regulate the interaction between independent entities such as computer devices and individuals and the database. Specifically, a device or a user that makes a request to access a character string must first register with the gatekeeper module 400. Such formal controls provide a mechanism to control who and what can access the credit card numbers in the database.

In various embodiments, the device or the user will subscribe with the gatekeeper module 400 to gain access to the information stored in the database. As a result, various devices and users may be given various levels of access. For example, the batching module, as previously discussed, will subscribe with the gatekeeper module 400 to be able to submit credit card number requests to the gatekeeper module 400. Another module, that records and reports a user's transaction history, may only need to retrieve the sub-strings associated with the tokens to display a user's transaction history, and therefore, this module's subscription only provides access to the sub-strings. In addition, the gatekeeper module 400 may provide various other subscription levels, such as privileges to access tokens only.

Thus, a device or a user will need to provide a token, a sub-string, or some other information and sufficient credentials to the gatekeeper module 400 for the device or the user to gain access to the information in the database. The processor 60 will execute the gatekeeper module 400 to check the device's or the user's credentials to determine if the device or the user is allowed to perform the type of access or manipulation of the information the device or the user wants to perform. In various embodiments, the credentials may take many forms. For example, the processor 60 executes the gatekeeper module 400 to provide a key upon registration to the subscribing device or the subscribing user so that the device or the user may send the key as credentials along with a request. In other embodiments, the processor 60 executes the gatekeeper module 400 to simply check the name of the device or the user against a record in a database table when the module 400 receives the request to determine whether the device or the user has the privilege to perform the request. One of ordinary skill in the art can think of numerous ways of adapting the gatekeeper module 400 to provide and check credentials for a device or a user to establish the device's or the user's level of access to the information in light of this disclosure.

In addition, the processor 60 also executes the gatekeeper module 400 of various embodiments to monitor the retention of the character strings and associated information stored in the database, shown as Step 509. Therefore, the processor 60 can execute the gatekeeper module 400 to determine whether any of the sensitive information stored in the database is out-dated and should be deleted or archived from the database. As a result, this will minimize the amount of sensitive information stored in the database and also minimize the liability of storing such information.

Thus, the processor 60 executes the gatekeeper module 400 to periodically check to determine whether any of the credit card numbers have expired or whether any of the credit card numbers have not been used within a set period of time, e.g., whether a certain period of time has elapsed since the credit card number was last used to make a purchase. Therefore, the processor 60 executes the gatekeeper module 400 to delete a credit card number along with any corresponding information from the database if the credit card number has expired or has not been used within the set period of time, shown as Step 510. In various embodiments, the processor 60 may also execute the gatekeeper module 400 to archive the credit card number and corresponding information first to an external storage medium, such as a disk or tap drive, before deleting the number and corresponding information from the database, shown as Step 511.

The processor 60 can execute the gatekeeper module 400 to monitor the character strings through various techniques. In one embodiment, the processor 60 executes the gatekeeper module 400 to check each record in the database at a certain time each day to determine if any credit card numbers need to be purged from the database, shown as Step 508. For example, the processor 60 executes a scheduling feature of the gatekeeper module 400 to run every morning at three o'clock a.m. and filters out any records that need to be purged from the database. In another embodiment, the processor 60 executes the gatekeeper module 400 to simply monitor each credit card number stored for a user in response to receiving a request for a particular credit card number associated with the user to determine if any of the user's stored credit card numbers are out of date. In other embodiments, the gatekeeper module 400 does not monitor information retention at all and this task is preformed by another module. One of ordinary skill in the art can envision several techniques in light of this disclosure that may be employed to ensure the character strings and corresponding information is purged if the information has expired.

At Step 513, the processor 60 executes the gatekeeper module 400 to transmit the character string to the device or the user requesting the character string according to various embodiments of the invention. As previously discussed, the device or the user making the request can vary. For example, the device or the user may be a program module executed on a computer, a GUI, or an external source such as a credit card company computer system. In addition, the processor 60 can execute the gatekeeper module 400 to provide the character string in various forms. In various embodiments, the processor 60 executes the gatekeeper module 400 to return the character string in a digital format such as in a data stream, a file, or an e-mail or to display the string on a computer monitor. In addition, the processor 60 may need to execute the gatekeeper module 400 to first decrypt the character string (shown as Step 512) to provide the string, such as in a standard text format. One of ordinary skill in the art is familiar with the numerous ways the processor 60 can execute the gatekeeper module 400 to transmit the character string to the device or the user requesting the string in light of this disclosure.

In many instances, the processor 60 also executes the gatekeeper module 400 to receive requests from devices and users to access a unique token associated with a character string. FIG. 6 illustrates a flow diagram related to a gatekeeper module 400 executed by a computer to transmit a unique token associated with a character string according to various embodiments of the invention. This flow diagram may correspond to the steps carried out by a processor 60 in the system 300 shown in FIG. 4 as it executes the gatekeeper module 400 in the RAM memory 67 of the system 300.

As previously discussed, in various embodiments, the processor 60 may execute the gatekeeper module 400 to initially obtain a character string from a device or a user. For example, the processor 60 may execute the gatekeeper module 400 to obtain the character string from various entities such as a GUI, a program module executing on a computer system, or other component such as a third-party computer system. However, it should be understood that the gatekeeper module 400 is not the only component that may receive the character string in order to store the string in storage.

Accordingly, if the gatekeeper module 400 does receive the character string, the processor 60 executes the gatekeeper module 400 to store the character string in storage in the same manner as previously discussed, shown as Step 602. Thus, in various embodiments, the processor 60 executes the gatekeeper module 400 to store the character string in a database, though in other embodiments, the processor 60 executes the gatekeeper module 400 to store the string in a file, data warehouse, or some type of program module. In addition, various types of storage devices may be used according to various embodiments of the invention. For instance, the storage devices may be internal or external hard drives, storage disks, magnetic tapes, USB flash drives, or some other type of storage devices.

In many cases the character string represents sensitive information, and therefore, the processor 60 will execute the gatekeeper module 400 to encrypt the string (shown as Step 601) or will execute a different module to encrypt the string prior to storing the string. In addition, the processor 60 may execute the gatekeeper module 400 of various embodiments to also obtain additional information to store in the database that is related to the character string.

Lastly, the processor 60 may execute the gatekeeper module 400 to store the character string in a centralized repository according to various embodiments of the invention. As previously discussed, such a repository may be important in the context of storing sensitive information such as credit card numbers.

In various embodiments, the processor 60 executes the gatekeeper module 400 to associate a unique token to the character string, as shown in Step 603. The processor 60 executes the gatekeeper module 400 to associate the unique token with the character string in the same manner as previously discussed above. Thus, in regard to the credit card example, the processor 60 executes the gatekeeper module 400 to create and to assign a unique token to the encrypted credit card number. The gatekeeper module 400 may create the unique token using various procedures. For example, in various embodiments, the processor 60 executes the gatekeeper module 400 to create the unique token by calling a random number generator module or by employing database primary keys used to distinguish records in the table of a database.

In various embodiments, the processor 60 executes the gatekeeper module 400 to store the unique token in the same storage as the character string. In other embodiments, the processor 60 executes the gatekeeper module 400 to store the unique token in separate storage. Thus, in the credit card example, the processor 60 may execute the gatekeeper module 400 to store the unique token in the same database as the encrypted credit card number or in a separate database.

In addition, as previously discussed, the processor 60 executes the gatekeeper module 400 to associate a sub-string of the character string associated with the token to identify that the token is associated with the character string without revealing the character string according to various embodiments of the invention, shown as Step 604. The use of such a sub-string provides a significant advantage over previous systems because it allows a user to operate a computing device to view what character strings are stored in storage without the gatekeeper module 400 (and/or other computer module) having to access, transmit, and display the actual character string to the user. In various embodiments, the processor 60 executes the gatekeeper module 400 to store the sub-string along with its corresponding token. In other embodiments, the processor 60 executes the gatekeeper module 400 to store the sub-string and token in separate storage (e.g., databases).

In Step 605, the processor 60 executes the gatekeeper module 400 to receive a request for the unique token, and in response, the processor 60 executes the gatekeeper module 400 to access the token from storage using the character string associated with the token according to various embodiments (shown as Step 606). The request can be made at various times and from various entities.

For example, a user visits a retailer's web site and selects one or more products to purchase. The user is sent by the retailer's web site to a "checkout" webpage to complete the purchase. Once on the "checkout" webpage, the user enters a new credit card number along with information on the "checkout" webpage to which to charge the purchase instead of using a credit card number previously stored. Since this is a new credit card number, the processor 60 executes the gatekeeper module 400 to obtain the credit card number and related information, to encrypt the card number and information, and to save the number and information to the database. In addition, the processor 60 executes the gatekeeper module 400 to generate and to associate a unique token with the new card number.

As previously discussed, a batching module may also be executed to receive the purchase transaction, and in conjunction to saving the purchase to a database, to send a request to the gatekeeper module 400 for the unique token associated with the new credit card number. The request includes the new credit card number. As a result, the processor 60 executes the gatekeeper module 400 to access the token by using the credit card number provided in the request and to transmit the token back to the batching module. Once the batching module retrieves the unique token associated with the new credit card number, the batching module is executed to save the purchase transaction to a database along with the token as opposed to the new credit card number.

The processor 60 may also execute the gatekeeper module 400 to verify whether the device or the user requesting the unique token (e.g., the batching module) is authorized to receive the token according to various embodiments of the invention, shown as Step 606. Thus, in order for a device or a user to gain access to the token, the device or the user will need to provide the character string and sufficient credentials to the gatekeeper module 400 and the processor 60 will execute the module 400 to check whether the device or the user is authorized to access the unique token.

As previously mentioned the processor 60 executes the gatekeeper module 400 of various embodiments to monitor the retention of the character strings and associated information stored in the database, shown as Step 609. Thus, the processor 60 will execute the gatekeeper module 400 to periodically check to determine whether any of the credit card numbers have expired or whether any of the credit card numbers have not been used within a set period of time, e.g., whether a certain period of time has elapsed since the credit card number was last used to make a purchase. Therefore, the processor 60 will execute the gatekeeper module 400 to delete a credit card number along with any corresponding information from the database if the credit card number has expired or has not been used within the set period of time, shown as Step 610. In various embodiments, the processor 60 may also execute the gatekeeper module 400 to archive the credit card number and corresponding information first to an external storage medium, such as a disk or tap drive, before deleting the number and corresponding information from the database, shown as Step 611.

The processor 60 can execute the gatekeeper module 400 to monitor the character strings through various techniques. In one embodiment, the processor 60 executes a scheduling feature of the gatekeeper module 400 to check each record in the database at a certain time each day to determine if any credit card numbers need to be purged from the database, shown as Step 608. In another embodiment, the processor 60 executes the gatekeeper module 400 to simply monitor each credit card number stored for a user in response to receiving a request for a particular token associated with the user to determine if any of the user's stored credit card numbers are out of date. In other embodiments, the processor 60 does not execute the gatekeeper module 400 to monitor information retention at all and this task is preformed by another executed module.

At Step 612, the processor 60 executes the gatekeeper module 400 to transmit the unique token to the device or the user requesting the token according to various embodiments of the invention. As previously discussed, the device or the user making the request can vary. For example, the device may be a program module executing on a computer system, a GUI, or an external source such as a credit card company computer system. In addition, the processor 60 can execute the gatekeeper module 400 to provide the token in various forms. In various embodiments, the processor 60 executes the gatekeeper module 400 to return the token in a digital format such as in a data stream, a file, or an e-mail or to display the token on a computer monitor. One of ordinary skill in the art is familiar with the numerous ways the gatekeeper module 400 can provide the token to the device or the user requesting the token in light of this disclosure.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What we claim is:

1. A method for lifecycle management of unique token associations that control access to sensitive information, the method comprising:
   generating, by a server device, a unique token for use in an online transaction in lieu of a character string stored as encrypted data by the server device, the character string received from a remote client computing device of a set of remote client computing devices associated with an entity registered with the server, wherein registering the entity includes associating the entity with a subscription level that provides access to the unique token;
   obtaining, by the server device, a record for an online transaction comprising information associated with the online transaction and the unique token, the record generated by any remote client computing device of the set of remote client computing devices;
   communicating, by the server device and to a transaction processing server device, a completed record for the online transaction including the information associated with the online transaction and the character string, wherein the character string is decrypted by the server device;
   determining, by the server device, that the character string is out-dated; and
   in response to determining that the character string is out-dated,
   disassociating, by the server device, the unique token and the character string stored as encrypted data, and
   deleting, by the server device, the character string from the first memory storage.

2. The method of claim 1, wherein the character string represents a credit card number.

3. The method of claim 1, wherein determining that the character string is out-dated comprises:
   determining whether the character string has expired; or
   determining whether the character string has not been used for at least a predetermined period of time.

4. The method of claim 3, wherein determining that the character string has expired comprises:
   determining whether a credit card represented by the character string has expired.

5. The method of claim 3, wherein determining whether the character string has not been used for at least the predetermined period of time comprises:
   determining whether a credit card represented by the character string has not been used for at least the predetermined period of time.

6. The method of claim 1, wherein the step of determining whether the character string is out-dated is performed periodically.

7. The method of claim 1, wherein the step of determining whether the character string is out-dated is performed in response to receipt of a request for the character string.

8. A data processing system for lifecycle management of unique token associations that control access to sensitive information, the data processing system comprising a processor and one or more storage devices embodying computer-readable program instructions that, when executed by the processor, cause the data processing system to:
   generate a unique token corresponding to a received character string, the unique token for use in an online transaction in lieu of the character string stored as encrypted data, the character string received from a remote client computing device associated with an entity registered with the server, wherein registering the entity includes associating the entity with a subscription level that provides access to the unique token;
   obtain a record for an online transaction comprising information associated with the online transaction and the unique token, the record generated by any of the set of remote client computing devices;
   communicate, to a server, a completed record for the online transaction including the information associated with the online transaction and the character string, wherein the character string is decrypted;
   determine whether the encrypted character string is out-dated; and
   in response to determining that the sensitive information is out-dated:
   disassociate the unique token and the character string stored as encrypted data; and
   delete the character string stored as encrypted data.

9. The data processing system of claim 8, wherein the character string represents a credit card number.

10. The data processing system of claim 8, wherein the computer-readable program instructions, when executed by the processor, cause the data processing system to determine whether the character string is out-dated by causing the data processing system to:
    determine whether the character string has expired; or
    determine whether the character string has not been used for at least a predetermined period of time.

11. The data processing system of claim 10, wherein the computer-readable program instructions, when executed by the processor, cause the data processing system to determine whether the character string has expired by causing the data processing system to:
    determine whether a credit card represented by the sensitive information has expired.

12. The data processing system of claim 10, wherein the computer-readable program instructions, when executed by the processor, cause the data processing system to determine whether the character string has not been used for at least the predetermined period of time by causing the data processing system to:
    determine whether a credit card represented by the character string has not been used for at least the predetermined period of time.

13. The data processing system of claim 8, wherein the computer-readable program instructions, when executed by the processor, cause the data processing system to determine whether the character string is out-dated periodically.

14. The data processing system of claim 8, wherein the computer-readable program instructions, when executed by the processor, cause the data processing system to determine whether the character string is out-dated in response to receipt of a request for character string.

15. A computer program product for lifecycle management of unique token associations that control access to sensitive information, the computer program product comprising a non-transitory computer-readable storage embodying computer-readable program instructions that, when executed, cause a processor to:
    associate a generated unique token to a received character string, the unique token for use in an online transaction in lieu of the character string stored as encrypted data, the character string received from a remote client computing device associated with an entity registered with the server, wherein registering the entity includes associating the entity with a subscription level that provides access to the unique token;

obtain a record for an online transaction comprising information associated with the online transaction and the unique token, the record generated by any of the set of remote client computing devices;

communicate, to a server, a completed record for the online transaction including the information associated with the online transaction and the character string, wherein the character string is decrypted;

determine whether the encrypted character string is out-dated; and in response to determining that the sensitive information is out-dated:

disassociate the unique token and the character string stored as encrypted data; and delete the character string stored as encrypted data.

16. The computer program product of claim 15, wherein the character string represents a credit card number.

17. The computer program product of claim 15, wherein the computer-readable program instructions, when executed, cause the processor to determine whether the character string is out-dated by causing the processor to:

determine whether the character string has expired; or determine whether the character string has not been used for at least a predetermined period of time.

18. The computer program product of claim 17, wherein the computer-readable program instructions, when executed, cause the processor to determine whether the character string has expired by causing the processor to:

determine whether a credit card represented by the character string has expired.

19. The computer program product of claim 17, wherein the computer-readable program instructions, when executed, cause the processor to determine whether the character string has not been used for at least the predetermined period of time by causing the processor to:

determine whether a credit card represented by the character string has not been used for at least the predetermined period of time.

20. The computer program product of claim 15, wherein the computer-readable program instructions, when executed, cause the processor to determine whether the character string is out-dated periodically.

21. The computer program product of claim 15, wherein the computer-readable program instructions, when executed, cause the processor to determine whether the character string is out-dated in response to receipt of a request for character string.

* * * * *

UNITED STATES PATENT AND TRADEMARK OFFICE
CERTIFICATE OF CORRECTION

PATENT NO. : 10,402,822 B2
APPLICATION NO. : 14/657065
DATED : September 3, 2019
INVENTOR(S) : Mahesh Sahasranaman et al.

It is certified that error appears in the above-identified patent and that said Letters Patent is hereby corrected as shown below:

On the Title Page

Item (56), Column 02 (Other Publications), Line 02: Please remove "Paymentric" and replace with --Paymetric,--.

Signed and Sealed this
Twenty-eighth Day of January, 2020

Andrei Iancu
*Director of the United States Patent and Trademark Office*